United States Patent [19]
Gauthier

[11] 3,941,937
[45] Mar. 2, 1976

[54] DIAL PULSE RECEIVER

[75] Inventor: John A. Gauthier, Brockville, Canada

[73] Assignee: GTE Automatic Electric (Canada) Limited, Brockville, Canada

[22] Filed: Sept. 27, 1974

[21] Appl. No.: 510,080

[52] U.S. Cl............................ 179/18 EB; 179/7 R
[51] Int. Cl.² ...................... H04Q 3/42; H04J 3/12
[58] Field of Search ............ 179/18 EB, 7 R, 7.1 R; 340/167 A; 328/111, 112

[56] References Cited
UNITED STATES PATENTS

| | | | |
|---|---|---|---|
| 3,366,778 | 1/1968 | De Stefano | 179/18 EB |
| 3,395,353 | 7/1968 | King | 328/111 |
| 3,725,598 | 4/1973 | Braun et al. | 179/18 EB |
| 3,851,110 | 11/1974 | Kelly et al. | 179/18 EB |

*Primary Examiner*—Thomas A. Robinson

[57] ABSTRACT

A dial pulse receiver having a clock pulse input to a counter and a first and second flip-flop. The outputs of the two flip-flops are coupled to an exclusive OR gate to reset the counter. The counter output and the two outputs of the second flip-flop are coupled to an output gate and latch configuration. The counter is set to enable the latches so only a legitimate dial pulse is recorded.

7 Claims, 4 Drawing Figures

DIAL PULSE RECEIVER

CROSS REFERENCE TO RELATED APPLICATIONS

This invention is incorporated in the Register and Sender Arrangement by Moorehead and Gauthier, Ser. No. 510,081, filed the same day as this application.

BACKGROUND OF THE INVENTION

1. Field of the Invention

The invention relates to the detection of dial pulses for a telephone communication switching system, and more particularly to detect only legitimate dial pulses and convert them into logic signals for use in the registers of a communication system.

2. Description of the Prior Art

The invention was developed for the system shown in U.S. Pat. No. 3,767,863, issued Oct. 23, 1973, by Borbas et al. for a Communication Switching System with Modular Organization and Bus, hereinafter referred to as the System S2 patent.

The previous system is described in U.S. Pat. No. 3,487,173, issued Dec. 30, 1969, by Duthie et al. for a Small Exchange Stored Program Switching System, hereinafter referred to as the System S1 patent. The dial pulse receiver of the S1 System was disclosed in U.S. Pat. No. 3,678,197, issued July 18, 1972 by Panter et al. for a Dial Pulse Incoming Trunk and Register Arrangement.

The dial pulse receiver (designated Dial Pulse Corrector, FIG. 11) in the Panter et al. patent was a discrete component circuit. This circuit has four transistor circuits and two capacitors. Two transistors served as in/out transistors and were coupled to the make and break contacts of a C contact (make and break contact) pulsing relay. The two capacitors and the four transistors provided the necessary delay by discharging or charging the respective capacitors. The accuracy of this circuit was, of course, dependent upon the various discrete components in the circuit and would vary from circuit to circuit by the nature of the components comprising the circuits. The number of discrete components in this circuit also made it an expensive circuit in comparison to the chip logic that was available for utilization in the System S2. This circuit could also not be adapted to the System S2 requirements as the battery feed device (BFD) in System S2 has only an A contact (make only contact).

SUMMARY OF THE INVENTION

According to the invention, a four-bit counter is provided with a 1 millisecond clock pulse from any convenient clock in a system and the counter is set to count for eight steps (8 milliseconds). The clock pulse is also coupled to the input of two flip-flops, the first flip-flop also being provided with the dial pulse input from an A contact of the battery feed device (BFD) of the circuit. The output of the first flip-flop is fed both to an exclusive OR circuit and to the second flip-flop. The outputs of the second flip-flop are fed to the second input of the exclusive OR circuit and also to the first inputs of two output NAND gates. The output of the exclusive OR is coupled to the counter to reset the counter on a change of state between the first and second flip-flop caused by a change of state in the battery feed device. Upon a count of 8 milliseconds the output of the counter is coupled to the second inputs of the two output NAND gates enabling them to record the new state of the battery feed device if the output of flip-flop number two is still present.

A first object of the invention is to provide a dial pulse receiver which will receive pulses from only a make contact of a battery feed device.

A second object of the invention is to provide a more accurate circuit.

A third object of the invention is to provide a receiver whose output will not vary from circuit to circuit.

A fourth object of the invention is to decrease the number of components required in the circuit.

A fifth object of the invention is to set a fixed delay to discriminate against non-legitimate dial pulses.

A final object of the invention is to provide a receiver which can be tested with an automatic card test.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF THE PREFERRED EMBODIMENT

Figure 1:
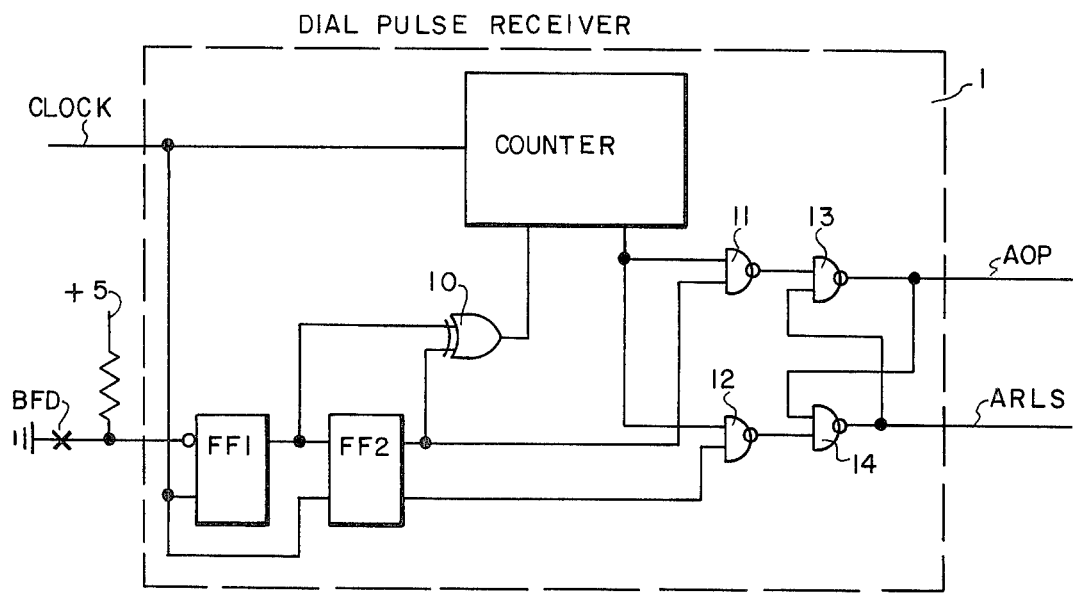
FIG. 1 is a schematic diagram of the improved dial pulse receiver.

FIG. 1 shows the improved dial pulse receiver of the invention 1 which is composed of 7400-Series Transistor Transistor Logic (TTL). The circuit is composed of commercial 7400 circuits including a 7493 four-bit binary counter, two 7474 edge triggered flip-flops, a 7486 input exclusive OR gate, and four 7400 NAND gates.

A one millisecond clock pulse is input to the counter and to flip-flop one (FF1) and flip-flop two (FF2). This clock pulse may be derived from any convenient clock in the circuitry or of course could be a clock provided with the dial pulse receiver itself. Such a clock is disclosed in the copending application to Moorehead and Gauthier. The single output from FF1 is tied to one input of the exclusive OR gate 10 and also to FF2. One of the dual outputs of FF2 is tied to NAND gate 12 and the second output is tied to both the second input of exclusive OR gate 10 and one input of NAND gate 11. The output of exclusive OR gate 10 is input to the counter. The output of the counter is coupled to the second input of NAND gates 11 and 12. The outputs of NAND gates 11 and 12 are inputs respectively to NAND gates 13 and 14. The second input to NAND gates 13 and 14 are provided by each other's respective outputs. The output of NAND gate 13 is also AOP and the output of NAND gate 14 is the output ARLS.

The operation of the dial pulse receiver is to monitor the dial pulses received via the A contact in the battery feed device (BFD) which is located in the register line circuit in the System S2. The dial pulse receiver rejects any short pulses which could be contact bounce or momentary opens in the loop upon switching through the network. The legitimate dial pulses which allow the BFD to operate and release for periods greater than 9 milliseconds are converted into logic signals for use in the register logic. The output AOP is a logic 1 and output ARLS is a 0 when the BFD has been operated for greater than 9 milliseconds. On release the opposite is then true; AOP is a 0 and ARLS is a logic 1. Normally dial pulses are received at a rate of 10 pulses per second with 60% break. (BFD released for 60 milliseconds).

FF1 and FF2 are arranged as a shift register and as such they shift 1's when the BFD is operated and 0's when it is released. When a change of state occurs at the A contact of the BFD the output of FF1 will switch on the first clock pulse, thus the inputs to exclusive OR gate 10 will be opposite for one clock period. This causes an output from exclusive OR 10 and this output is a logic 1 which resets the counter. The counter then counts for eight steps (8 milliseconds) before producing an output signal and this output of the counter enables NAND gates 11 and 12 to operate. If the change of state of contact A of the BFD was produced by the BFD operating and if it is still operated the output of NAND 11 will be a logic 1 and NAND 12 will be a logic 0. These outputs will be reversed if the BFD was released. The outputs of NAND gates 11 and 12 are fed to NAND gates 13 and 14 which are in a latch type configuration and serve to record and store the last legitimate state of the BFD. If operated AOP will be equal to 1 and ARLS will be equal to 0. If released, ARLS will be equal to 1 and AOP will be equal to 0. When ARLS goes from a 0 state to a 1 state, a count is recorded in the dial pulse counter and this counter forms a part of the rest of the register logic.

Figure 2:
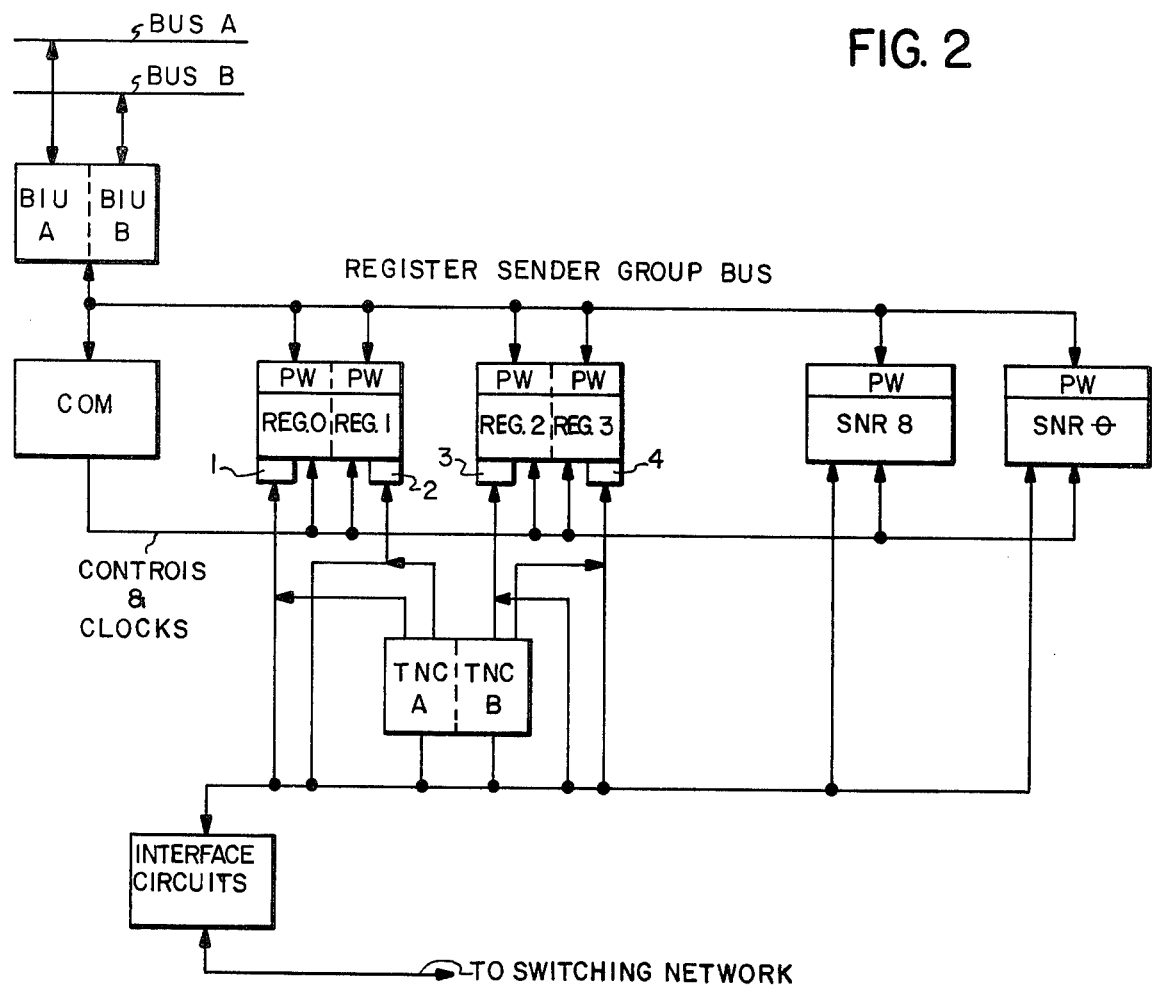
FIG. 2 is a block diagram of a particular register and sender arrangement which incorporates a dial pulse receiver.

FIG. 2 shows a register and sender arrangement which could incorporate the present invention. Briefly for a signal from the System S2 control, the signal would be coupled onto Bus A or Bus B and coupled through the respective bus interface unit (BIU) to the register sender group bus and from the group bus to the respective common control (COM) and the registers and senders here designated registers 0, 1, 2, and 3 (REG) and senders 8 and 10 (SNR). From a sender the signal would be coupled to the interface circuits and thence to the switching network. For the registers the signal would be coupled from the switching network through the interface circuits to the tine control card (TNC), or register card (REG), which accommodate touch calling multifrequency, 2/6 multifrequency tone signals and dial pulse from incoming trunks or subscribers. Dial pulses are transmitted to the dial pulse receivers 1, 2, 3, and 4 respectively and thence to their respective registers. Further details of the register and sender arrangement are found in the above referenced copending application to Moorehead and Gauthier.

Figure 3:
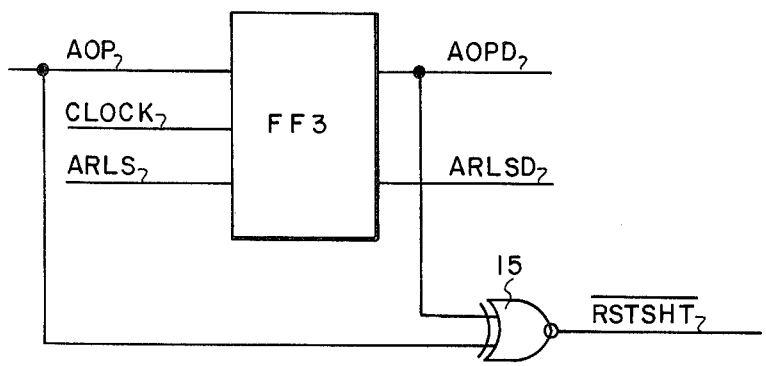
FIG. 3 shows an interface that is added to the output of the dial pulse receiver which adds one more delay pulse which allows it to function with the remaining register logic in the system.

FIG. 3 shows a modification of the invention which adds another millisecond to the delay to make a total of 10 milliseconds. This modification would be added to the output of the dial pulse receiver of FIG. 1 to enable it to be used in the above-mentioned copending application to Moorehead and Gauthier for the System S2. FF3 is also of the 7400 series logic being a 7476 dual JK flip-flop and exclusive OR gate 15 is another 7486 device. This modification is connected to the dial pulse receiver by connecting the outputs of latch type configuration NAND gates 13 and 14 to the inputs FF3.

These inputs (AOP and ARLS) and the same 1 millisecond clock pulse provide the inputs to FF3. NAND gates 13 and 14 and FF3 are arranged as a shift register and with exclusive OR 15 they provide another one clock period delay to give a total of 10 milliseconds on a change of state of the A contact. The outputs of the circuits are now AOPD (a relay operated) and ARLSD (a relay released) and RSTSHT. RSTSHT is used to clear the register control shift registers in registers 1–4.

Figure 4:
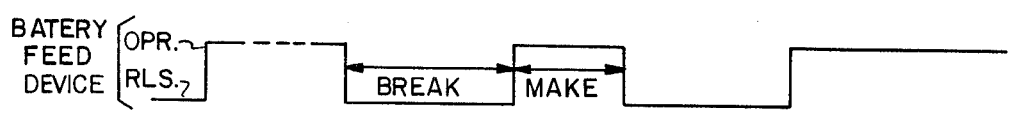
FIG. 4 shows a timing diagram for the system.
Figure 4:
Figure 4:
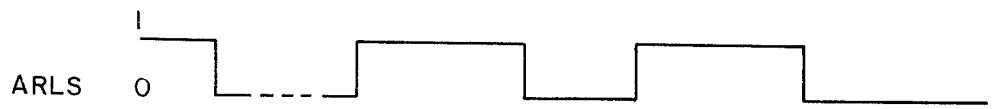

FIG. 4 shows the timing chart for the system. The BFD (contact A) is shown operated and released. Typically 60 percent break (released) and 40 percent make (operated). The 0 and 1 outputs of AOP and ARLS are also shown. The counter counts when ARLS goes from 0 to 1.

While the invention has been described in a particular application above, it may also be used in other circuits as a contact bounce eliminator or as a short pulse eliminator. It could also be used as a delay circuit with the delay dependent upon the clock rate. The delay produced of course would have to be shorter than the incoming pulses.

While principles of the invention have been illustrated above in connection with specific apparatus and applications, it is to be understood the description is made only by way of example and not as a limitation on the scope of the invention as encompassed by the following claims.

What I claim is:

1. An improved dial pulse receiver for a register and sender arrangement of a communication switching system, said arrangement comprising a plurality of registers and senders, a single clock source producing a single train of clock pulses, and a battery feed device, wherein dial pulses are received by said dial pulse receiver from the battery feed device contact and transmitted from said dial pulse receiver to said registers, said improved dial pulse receiver comprising:
    counter means directly connected to said clock pulses;
    flip-flop means directly connected to said clock pulses and said dial pulses;
    counter reset means coupled to said counter means and to said flip-flop means; and
    gate output means coupled to said flip-flop means and to said counter means;
    whereby on receiving a dial pulse the output of said flip-flop means is input to said reset means to reset said counter means and said output being also input to said gate output means, on reaching a predetermined count the output of said counter means enabling said gate output means to transmit a legitimate dial pulse signal if said flip-flop means output is still present at said gate output means or a no legitimate signal being transmitted from said gate output means if said flip-flop means output is no longer present.

2. An improved dial pulse receiver as claimed in claim 1 wherein said flip-flop means comprises:
    first flip-flop means coupled to said counter reset means; and
    second flip-flop means coupled to said first flip-flop means and to said gate output means and said counter reset means;
    whereby said clock pulses and dial pulses are input to said first flip-flop means, and said clock pulses are input to said second flip-flop means, and the outputs of said first flip-flop means and said second flip-flop means are equal except for one clock pulse following a change of state in the dial pulse input.

3. An improved dial pulse receiver as claimed in claim 2 wherein said counter reset means comprises:
an exclusive OR circuit with one input from said first flip-flop means and a second input from said second flip-flop means;
wherein when the two inputs are different for one clock pulse said exclusive OR circuit produces an output to reset said counter means.

4. An improved dial pulse receiver as claimed in claim 1 wherein said gate output means comprises:
two input NAND gates coupled to two output NAND gates, said two output NAND gates being configured in a latch type configuration.

5. An improved dial pulse receiver as claimed in claim 1 further comprising:
third flip-flop means coupled to said gate output means; and
an exclusive OR means coupled to said third flip-flop means;
whereby said dial pulse must be present for 10 milliseconds for a legitimate dial pulse signal to be output from the circuit.

6. An improved dial pulse receiver as claimed in claim 1 wherein said flip-flop means comprises:
first flip-flop means coupled to said counter reset means; and
second flip-flop means coupled to said first flip-flop means and to said gate output means and said counter reset means; said counter reset means comprising:
an exclusive OR circuit with one input from said first flip-flop means and a second input from said second flip-flop means; and
said gate output means comprising:
two input NAND gates coupled to two output NAND gates, said two output NAND gates being configured in a latch type configuration;
whereby said clock pulses and dial pulses are input to said first flip-flop means, and said clock pulses are input to said second flip-flop means, and the outputs of said first flip-flop means and said second flip-flop means are equal except for one clock pulse following a change of state in the dial pulse input, and during said one clock pulse said exclusive OR circuit produces an output to reset said counter means.

7. An improved dial pulse receiver as claimed in claim 6 further comprising:
third flip-flop means coupled to said output gate means; and
an exclusive OR means coupled to said third flip-flop means;
whereby said dial pulse must be present at the input for 10 milliseconds for a legitimate dial pulse signal to be output from the circuit.

* * * * *